(12) United States Patent
Pezeshki et al.

(10) Patent No.: US 11,570,778 B2
(45) Date of Patent: Jan. 31, 2023

(54) SEMI-PERSISTENT SCHEDULING SUBBAND SWITCHING

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/947,071

(22) Filed: Jul. 16, 2020

(65) Prior Publication Data
US 2021/0045116 A1 Feb. 11, 2021

Related U.S. Application Data

(60) Provisional application No. 62/885,140, filed on Aug. 9, 2019.

(51) Int. Cl.
*H04L 12/28* (2006.01)
*H04W 72/04* (2009.01)
*H04B 7/0452* (2017.01)
*H04J 1/16* (2006.01)

(52) U.S. Cl.
CPC ...... *H04W 72/0453* (2013.01); *H04B 7/0452* (2013.01)

(58) Field of Classification Search
CPC ..... H04L 5/001; H04L 5/0098; H04L 1/1854; H04W 7/0452; H04W 72/0453; H04W 74/006; H04B 7/0452; H04B 7/0413

USPC .......................... 370/252, 329, 430
See application file for complete search history.

(56) References Cited

U.S. PATENT DOCUMENTS

| | | | |
|---|---|---|---|
| 2015/0098341 A1 | 4/2015 | Ramkumar et al. | |
| 2020/0275484 A1* | 8/2020 | Xu | H04W 72/042 |
| 2020/0351801 A1* | 11/2020 | Jeon | H04W 52/48 |
| 2021/0321392 A1* | 10/2021 | Hooli | H04L 5/0078 |
| 2022/0141805 A1* | 5/2022 | Tooher | H04L 5/0053 370/336 |

(Continued)

FOREIGN PATENT DOCUMENTS

| | | |
|---|---|---|
| EP | 2451233 A1 | 5/2012 |
| WO | 2014070049 A1 | 5/2014 |

OTHER PUBLICATIONS

International Search Report and Written Opinion—PCT/US2020/070293—ISA/EPO—dated Sep. 15, 2020.

*Primary Examiner* — John Pezzlo
(74) *Attorney, Agent, or Firm* — Harrity & Harrity, LLP

(57) ABSTRACT

Various aspects of the present disclosure generally relate to wireless communication. In some aspects, a base station (BS) may detect, for physical downlink shared channel transmissions in a multi-panel frequency division multiplexing deployment with multi-user, multiple input, multiple output transmission, a semi-persistent scheduling occasion update event. The BS may switch from performing semi-persistent scheduling for the physical downlink shared channel transmissions on a first subband to performing semi-persistent scheduling for the physical downlink shared channel transmissions on a second subband. Numerous other aspects are provided.

20 Claims, 8 Drawing Sheets

700 ⟶

710 — Determine, after a failure of a physical downlink shared channel transmission, in a first subband, a success for a retransmission of the physical downlink shared channel transmission in a second subband

↓

720 — Switch to the second subband after detection of a semi-persistent scheduling occasion update event based at least in part on determining the success for the retransmission of the physical downlink shared channel transmission in the second subband

(56) References Cited

U.S. PATENT DOCUMENTS

2022/0173867 A1* 6/2022 Nogami ............... H04L 5/001

* cited by examiner

# SEMI-PERSISTENT SCHEDULING SUBBAND SWITCHING

CROSS-REFERENCE TO RELATED APPLICATION

This Patent Application claims priority to U.S. Provisional Patent Application No. 62/885,140, filed on Aug. 9, 2019, entitled "SEMI-PERSISTENT SCHEDULING SUBBAND SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for semi-persistent scheduling subband switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station (BS), may include detecting, for physical downlink shared channel transmissions in a multi-panel frequency division multiplexing deployment with multi-user, multiple input, multiple output transmission, a semi-persistent scheduling occasion update event; and switching from performing semi-persistent scheduling for the physical downlink shared channel transmissions on a first subband to performing semi-persistent scheduling for the physical downlink shared channel transmissions on a second subband.

In some aspects, a BS for wireless communication may include memory and one or more processors coupled with to the memory. The memory and the one or more processors may be configured to detect, for physical downlink shared channel transmissions in a multi-panel frequency division multiplexing deployment with multi-user, multiple input, multiple output transmission, a semi-persistent scheduling occasion update event; and switch from performing semi-persistent scheduling for the physical downlink shared channel transmissions on a first subband to performing semi-persistent scheduling for the physical downlink shared channel transmissions on a second subband.

In some aspects, a non-transitory computer-readable medium may store one or more instructions for wireless communication. The one or more instructions, when executed by one or more processors of a BS, may cause the one or more processors to detect, for physical downlink shared channel transmissions in a multi-panel frequency division multiplexing deployment with multi-user, multiple input, multiple output transmission, a semi-persistent scheduling occasion update event; and switch from performing semi-persistent scheduling for the physical downlink shared channel transmissions on a first subband to performing semi-persistent scheduling for the physical downlink shared channel transmissions on a second subband.

In some aspects, an apparatus for wireless communication may include means for detecting, for physical downlink shared channel transmissions in a multi-panel frequency division multiplexing deployment with multi-user, multiple input, multiple output transmission, a semi-persistent scheduling occasion update event; and means for switching from performing semi-persistent scheduling for the physical downlink shared channel transmissions on a first subband to performing semi-persistent scheduling for the physical downlink shared channel transmissions on a second subband.

In some aspects, a method of wireless communication performed by a base station (BS) includes determining, after a failure of a physical downlink shared channel transmission, in a first subband, a success for a retransmission of the physical downlink shared channel transmission in a second subband; and switching to the second subband after detection of a semi-persistent scheduling occasion update event based at least in part on determining the success for the retransmission of the physical downlink shared channel transmission in the second subband.

In some aspects, a non-transitory computer-readable medium storing a set of instructions for wireless communication includes one or more instructions that, when executed by one or more processors of a base station (BS), cause the BS to: determine, after a failure of a physical downlink shared channel transmission, in a first subband, a success for a retransmission of the physical downlink shared channel transmission in a second subband; and switch to the second subband after detection of a semi-persistent scheduling occasion update event based at least in part on determining the success for the retransmission of the physical downlink shared channel transmission in the second subband.

In some aspects, a base station (BS) for wireless communication includes a memory; and one or more processors operatively coupled to the memory, the memory and the one or more processors configured to: determine, after a failure of a physical downlink shared channel transmission, in a first subband, a success for a retransmission of the physical downlink shared channel transmission in a second subband; and switch to the second subband after detection of a semi-persistent scheduling occasion update event based at least in part on determining the success for the retransmission of the physical downlink shared channel transmission in the second subband.

In some aspects, an apparatus for wireless communication includes means for determining, after a failure of a physical downlink shared channel transmission, in a first subband, a success for a retransmission of the physical downlink shared channel transmission in a second subband; and means for switching to the second subband after detection of a semi-persistent scheduling occasion update event based at least in part on determining the success for the retransmission of the physical downlink shared channel transmission in the second subband.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
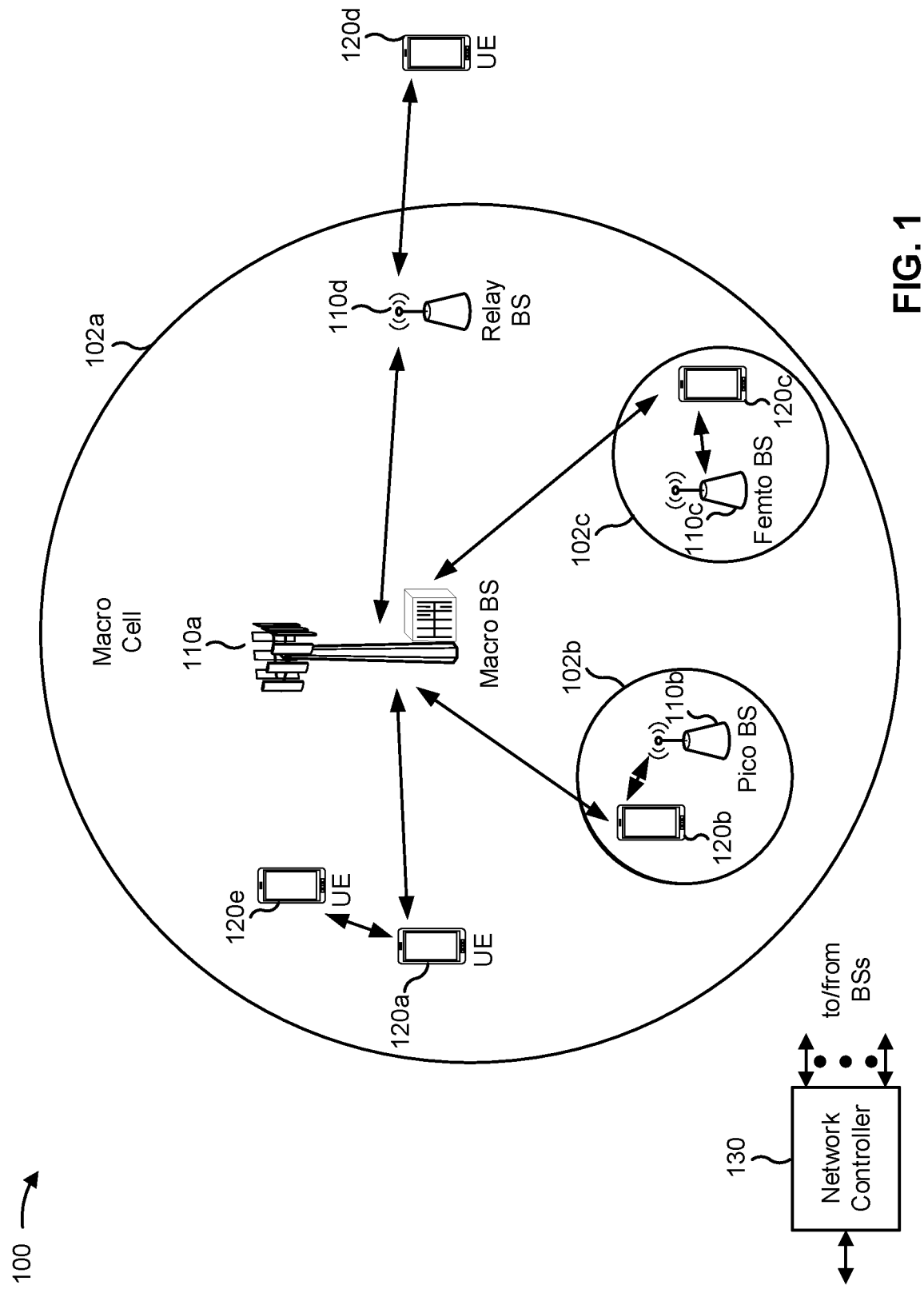
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
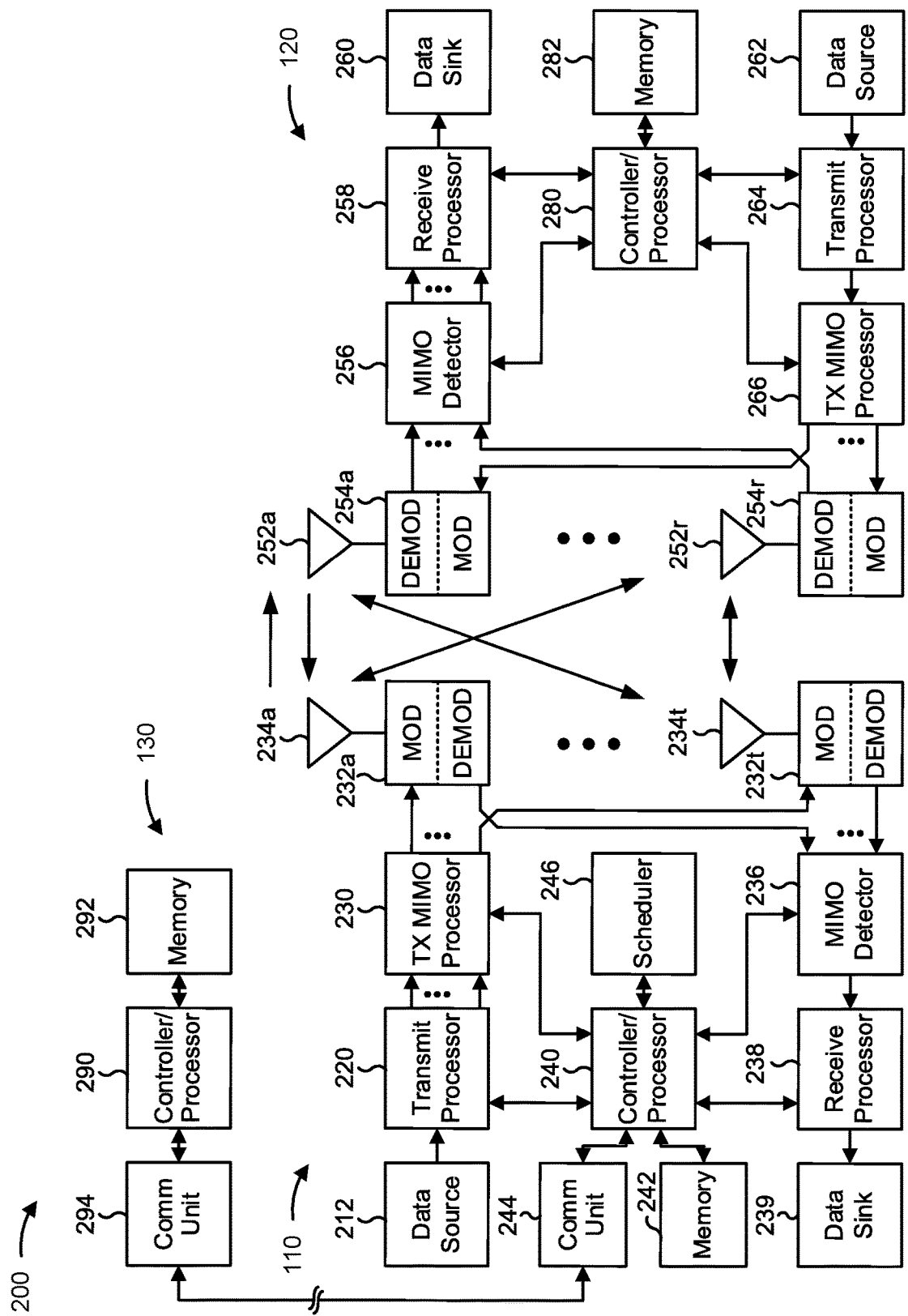
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with semi-persistent scheduling subband switching, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 700, of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 700 of FIG. 7, and/or other processes as described herein. A scheduler 246 may schedule UEs for data transmission on the downlink and/or uplink.

In some aspects, base station 110 may include means for detecting, for physical downlink shared channel transmissions in a multi-panel frequency division multiplexing deployment with multi-user, multiple input, multiple output transmission, a semi-persistent scheduling occasion update event, means for switching from performing semi-persistent scheduling for the physical downlink shared channel transmissions on a first subband to performing semi-persistent scheduling for the physical downlink shared channel transmissions on a second subband, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a multi-panel frequency division multiplexing deployment, a BS may be configured to perform multi-panel frequency division multiplexing with one or more UEs. For example, a network operator may deploy a BS with a plurality of panels, with each panel including a plurality of antennas. The BS may use the plurality of panels and the plurality of antennas for multi-panel frequency division multiplexing (FDM) transmission operations. In some cases, the BS may also perform analog beamforming-based multi-user, multiple input, multiple output (MU-MIMO) operations when performing multi-panel FDM transmission. In this way, the BS may efficiently and concurrently communicate with a plurality of UEs across a plurality of subbands.

The BS may use a static semi-persistent scheduling pattern for the UEs when performing analog beamforming-based MU-MIMO with multi-panel FDM transmission. However, when a quality of a current subband on which the BS is scheduling transmissions degrades, semi-persistent scheduling transmissions may fail, which may trigger successful retransmissions in new subbands. In this case, using a static semi-persistent scheduling pattern on the current subband may result in the BS continuing to use the current subband despite the degraded quality and the successful retransmissions in the new subbands.

Some aspects described herein enable semi-persistent scheduling occasion updating across subbands. For example, a BS may switch subbands for semi-persistent scheduling based at least in part on detecting a semi-persistent scheduling occasion update event. In this case, the semi-persistent scheduling occasion update event may be a threshold quantity of failures of semi-persistent scheduling initial transmissions on a current subband, a threshold quantity of successful semi-persistent scheduling retransmissions on a new subband, an end of a cycle defining a subband switching pattern, and/or the like. In this way, the BS may reduce a likelihood of failed semi-persistent scheduling transmissions when performing analog beamforming-based MU-MIMO with multi-panel FDM transmissions, thereby reducing network resource utilization associated with performing retransmissions.

Figure 3A:
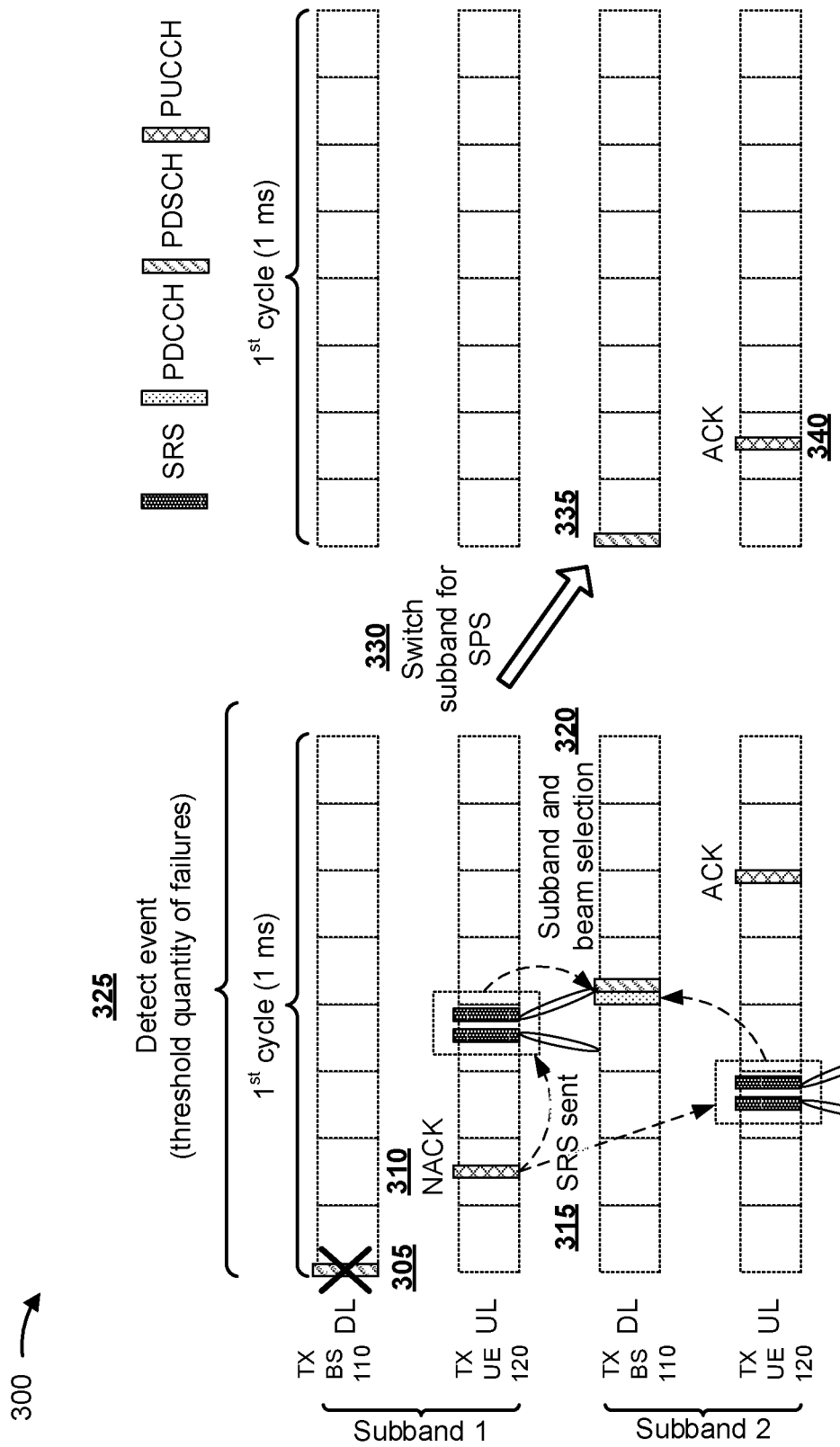
FIGS. 3A-3B are diagrams illustrating examples of semi-persistent scheduling subband switching, in accordance with various aspects of the present disclosure.
Figure 3B:
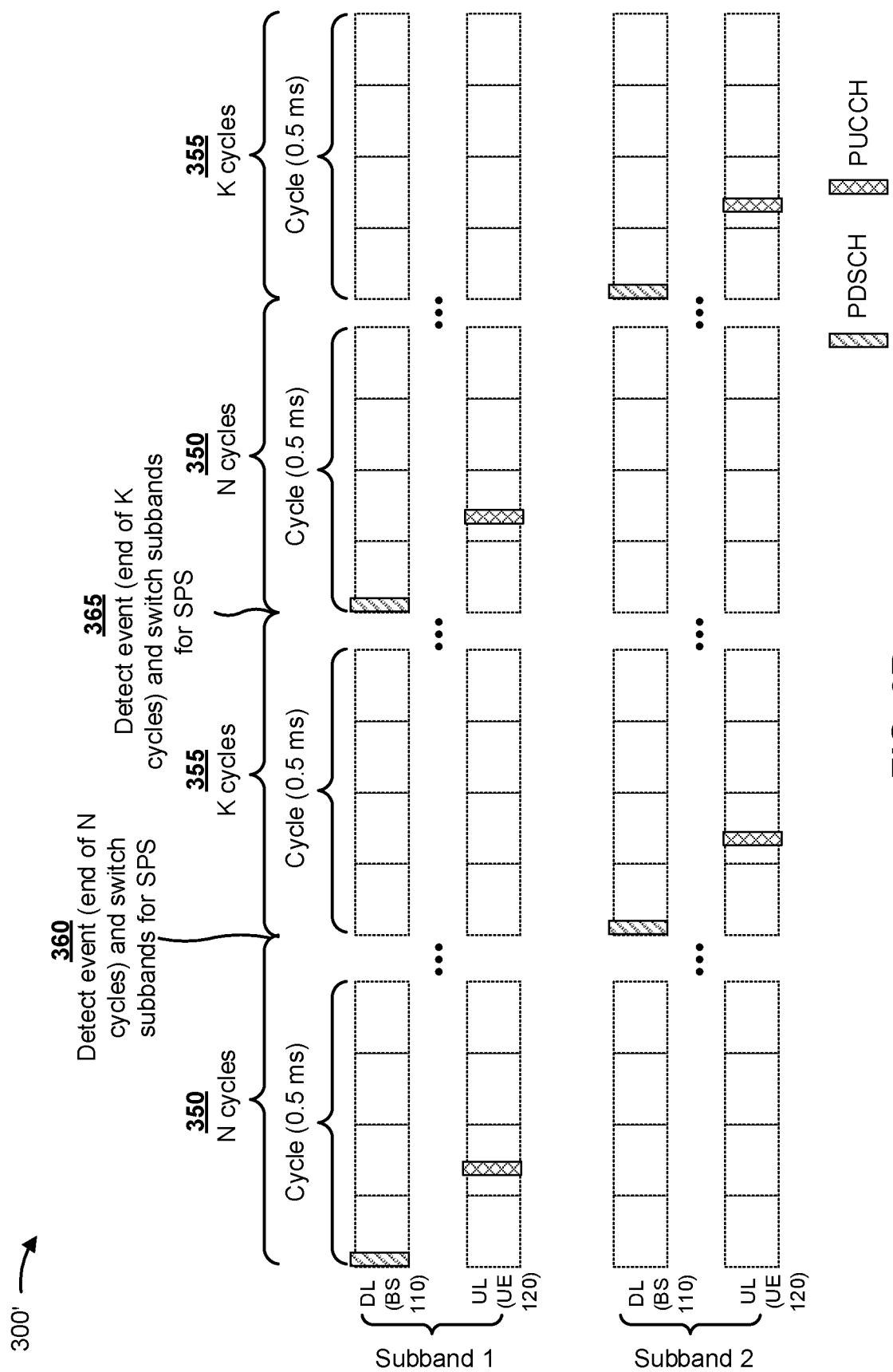

FIGS. 3A-3B are diagrams illustrating examples 300/300' of semi-persistent scheduling subband switching, in accordance with various aspects of the present disclosure. For example, as shown in FIGS. 3A-3B, examples 300/300' may include a BS 110 and a UE 120.

As shown in FIG. 3A, and by reference number 305, when performing semi-persistent scheduling for FDM with MU-MIMO physical downlink shared channels (PDSCHs), BS 110 may transmit a PDSCH on a first subband to a UE 120 that may be unsuccessful. As shown by reference number 310, based at least in part on the PDSCH being unsuccessful, UE 120 may transmit a negative acknowledgement (NACK) feedback message (e.g., via a physical uplink control channel (PUCCH)) to BS 110 to indicate that the PDSCH transmission was unsuccessful. As shown by reference number 315, UE 120 may transmit a sounding reference signal (SRS) on the first subband and a second subband to enable subband and beam selection. As shown by reference number 320, BS 110 may perform subband and beam selection. For example, based at least in part on the SRSs, BS 110 may transmit a physical downlink control channel (PDCCH) including scheduling information and an associated retransmission of the PDSCH on a beam of the second subband. In this case, UE 120 may successfully receive the PDSCH and the PDCCH on the second subband and may transmit an acknowledgement (ACK) feedback message.

As further shown in FIG. 3A, and by reference number 325, BS 110 may detect that a semi-persistent scheduling occasion update event has occurred. For example, BS 110 may detect a threshold quantity of PDSCH transmission failures within a threshold amount of time. Additionally, or alternatively, BS 110 may detect, as responses to the threshold quantity of PDSCH transmission failures on the first subband, a threshold quantity of PDSCH transmission successes on the second subband.

As further shown in FIG. 3A, and by reference number 330, BS 110 may switch subbands for semi-persistent scheduling. For example, based at least in part on detecting that the semi-persistent scheduling occasion update event has occurred, BS 110 may switch from performing semi-persistent scheduling on the first subband to performing semi-persistent scheduling on the second subband. In this case, as shown by reference numbers 335 and 340, BS 110 may transmit a PDSCH on the second subband and may receive, from UE 120, an ACK feedback message via a PUCCH on the second subband. In this way, BS 110 uses transmission failure and/or retransmission success to update a semi-persistent scheduling occasion configuration. Based at least in part on updating the semi-persistent scheduling occasion configuration, BS 110 reduces a likelihood of subsequent failed transmissions.

As shown in FIG. 3B, in an example of another type of semi-persistent scheduling occasion update event, BS 110 may be configured with a pattern of a plurality of configurations for semi-persistent scheduling. For example, BS 110 may be configured with a first configuration 350 in which BS 110 is to transmit initial PDSCHs and receive PUCCH responses on a first subband and may be configured with a second configuration 355 in which BS 110 may transmit initial PDSCHs and receive PUCCH responses on a second subband. In this case, the first configuration 350 may be associated with a first cycle length (e.g., 0.5 milliseconds (ms) per cycle) and a first quantity of cycles before a switch to a different configuration (e.g., a quantity, N, of cycles corresponding to N PDSCH transmissions). Similarly, the second configuration 355 may be associated with a second cycle length (e.g., 0.5 ms per cycle) and a second quantity of cycles (e.g., K cycles) before switching configurations.

As further shown in FIG. 3B, and by reference number 360, BS 110 may detect a semi-persistent scheduling occasion update event based at least in part on the first quantity of cycles being complete. In this case, BS 110 may switch from the first configuration 350 to the second configuration 355 and, as a result, switch from transmitting the initial PDSCHs and receiving the PUCCHs on the first subband to transmitting the initial PDSCHs and receiving the PUCCHs on the second subband. Similarly, as shown by reference number 365, BS 110 may detect another semi-persistent scheduling update event based at least in part on the second quantity of cycles being complete. In this case, BS 110 may switch from the second configuration 355 to the first configuration 350. In another example, BS 110 may have another quantity of configurations (e.g., on two or more subbands), another pattern of configurations, and/or the like.

In this way, BS 110 uses a pre-configured semi-persistent scheduling occasion update pattern to enable semi-persistent scheduling occasion updating. For example, BS 110 may perform semi-persistent scheduling occasion updating even when retransmissions do no occur as a result of limited cycle duration or when an amount of time available for semi-persistent scheduling occasion updating is not sufficient for configuring a different semi-persistent scheduling occasion.

As indicated above, FIGS. 3A-3B are provided as examples. Other examples may differ from what is described with respect to FIGS. 3A-3B.

Figure 4:
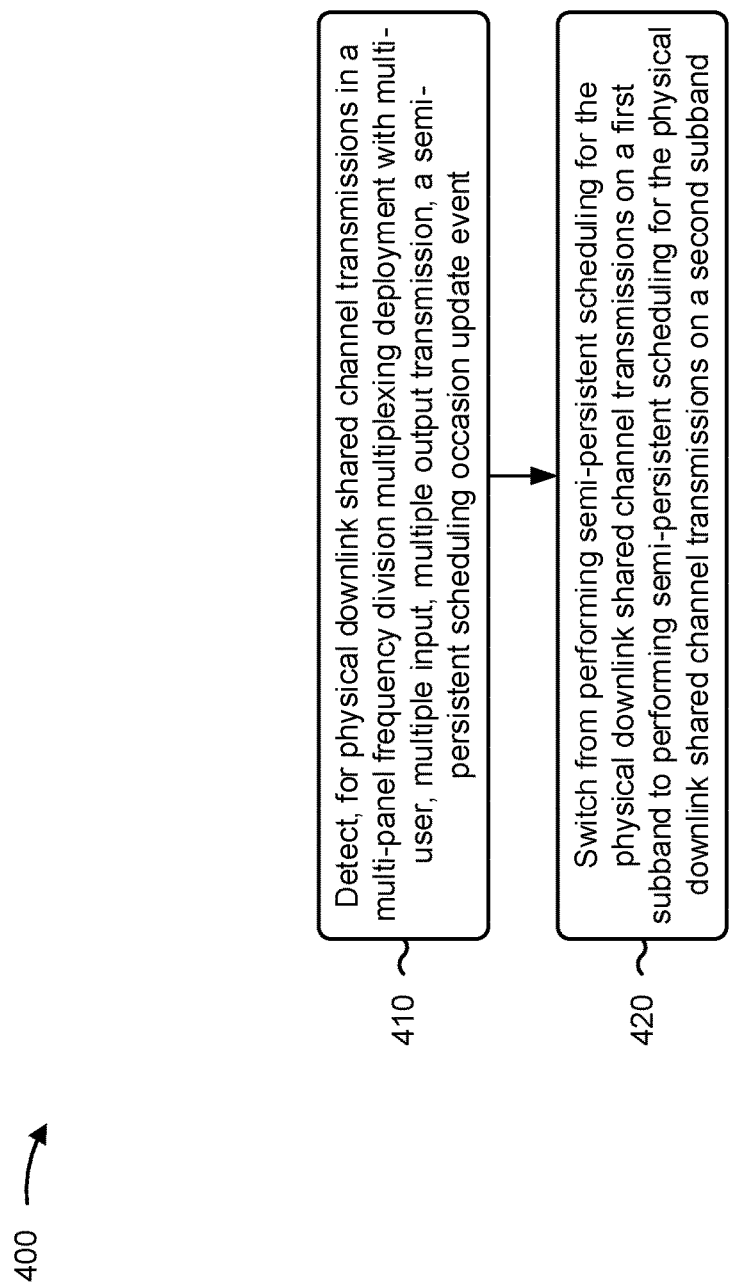
FIG. 4 is a diagram illustrating an example process performed, for example, by a base station, in accordance with various aspects of the present disclosure.

FIG. 4 is a diagram illustrating an example process 400 performed, for example, by a BS, in accordance with various aspects of the present disclosure. Example process 400 is an example where a BS (e.g., BS 110, the apparatus 502/502', and/or the like) performs operations associated with semi-persistent scheduling subband switching.

As shown in FIG. 4, in some aspects, process 400 may include detecting, for physical downlink shared channel transmissions in a multi-panel frequency division multiplexing deployment with multi-user, multiple input, multiple output transmission, a semi-persistent scheduling occasion update event (block 410). For example, the BS (e.g., using transmit processor 220, receive processor 238, controller/processor 240, memory 242, and/or the like) may detect, for physical downlink shared channel transmissions in a multi-panel frequency division multiplexing deployment with multi-user, multiple input, multiple output transmission, a semi-persistent scheduling occasion update event, as described above in connection with FIGS. 3A and/or 3B.

In a first aspect, the semi-persistent scheduling occasion update event is a threshold quantity of physical downlink shared channel transmission failures within a threshold amount of time.

In a second aspect, alone or in combination with the first aspect, process 400 includes determining, after a failure of a physical downlink shared channel transmission, of the physical downlink shared channel transmissions, in the first subband, a success for a retransmission of the physical downlink shared channel transmission in the second subband; and determining to switch to the second subband after detection of the semi-persistent scheduling occasion update event based at least in part on determining the success for the retransmission of the physical downlink shared channel transmission in the second subband.

In a third aspect, alone or in combination with one or more of the first and second aspects, the semi-persistent scheduling occasion update event is a completion of a physical downlink shared channel transmission and physical uplink control channel reception cycle.

As further shown in FIG. 4, in some aspects, process 400 may include switching from performing semi-persistent scheduling for the physical downlink shared channel transmissions on a first subband to performing semi-persistent scheduling for the physical downlink shared channel transmissions on a second subband (block 420). For example, the BS (e.g., using transmit processor 220, receive processor 238, controller/processor 240, memory 242, and/or the like) may switch from performing semi-persistent scheduling for the physical downlink shared channel transmissions on a first subband to performing semi-persistent scheduling for the physical downlink shared channel transmissions on a second subband, as described above in connection with FIGS. 3A and/or 3B.

In a fourth aspect, alone or in combination with one or more of the first through third aspects, switching from the first subband to the second subband includes switching from the first subband to the second subband in accordance with a semi-persistent scheduling occasion switching pattern.

Process 400 may include additional aspects, such as any single aspect or any combination of aspects described above and/or in connection with one or more other processes described elsewhere herein.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
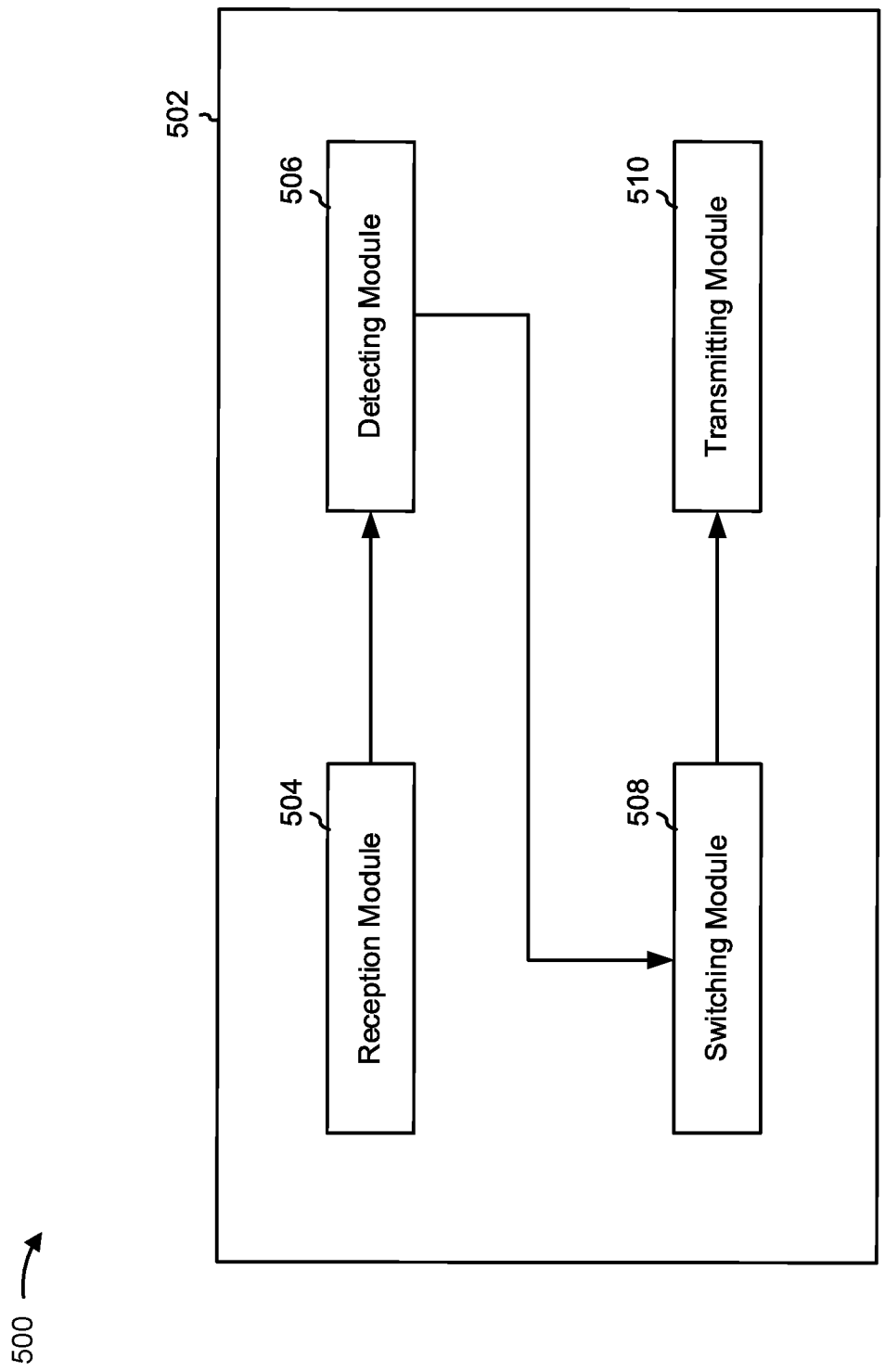
FIG. 5 is a conceptual data flow diagram illustrating an example of a data flow between different modules/means/components in an example apparatus.

FIG. 5 is a conceptual data flow diagram illustrating an example 500 of a data flow between different modules/means/components in an example apparatus 502. The apparatus 502 may include, for example, a BS (e.g., BS 110). In some aspects, the apparatus 502 includes a reception module 504, a detecting module 506, a switching module 508, and a transmitting module 510.

In some aspects, reception module 504 may receive transmissions that are transmitted to apparatus 502. For example, reception module 504 may receive a PUCCH conveying a NACK feedback message, an ACK feedback message, and/or the like, as described above in connection with FIGS. 3A-3B. When a semi-persistent scheduling occasion update event relates to a quantity of failed PDSCH transmissions (e.g., identified based at least in part on received NACK feedback messages) or a quantity of successful PDSCH retransmissions (e.g., identified based at least in part on received ACK feedback messages), reception module 504 may provide an indication of a received feedback message to detecting module 506.

In some aspects, detecting module 506 may detect whether a semi-persistent scheduling occasion update event has occurred. For example, detecting module 506 may detect whether a threshold quantity of PDSCH transmission failures have occurred within a threshold period of time, as described above with regard to FIG. 3A. Additionally, or alternatively, detecting module 506 may detect whether a threshold quantity of PDSCH retransmission successes have occurred on a different subband than a current subband within a threshold period of time, as described above with regard to FIG. 3A. Additionally, or alternatively, detecting module 506 may detect whether a cycle associated with a particular semi-persistent scheduling occasion configuration has ended, as described above with regard to FIG. 3B. Based at least in part on detecting that a semi-persistent scheduling occasion update event has occurred, detecting module 506 may provide an indication of the semi-persistent scheduling occasion update event to switching module 508.

In some aspects, switching module 508 may cause transmitting module 510 to switch from transmitting messages (e.g., PDCCHs and/or PDSCHs) associated with semi-persistent scheduling occasions on a first subband to transmitting the messages on a second subband. For example, based at least in part on receiving the indication of the semi-persistent scheduling occasion update event from detection module 506, switching module 508 may cause a switch from a first subband to a second subband, from a first configuration to a second configuration, and/or the like as described above with regard to FIGS. 3A and 3B.

In some aspects, apparatus 502 may include additional modules that perform each of the blocks of the algorithm in the aforementioned flow chart of FIG. 4. As such, each block in the aforementioned flow charts of FIG. 4 may be performed by a module and apparatus 502 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
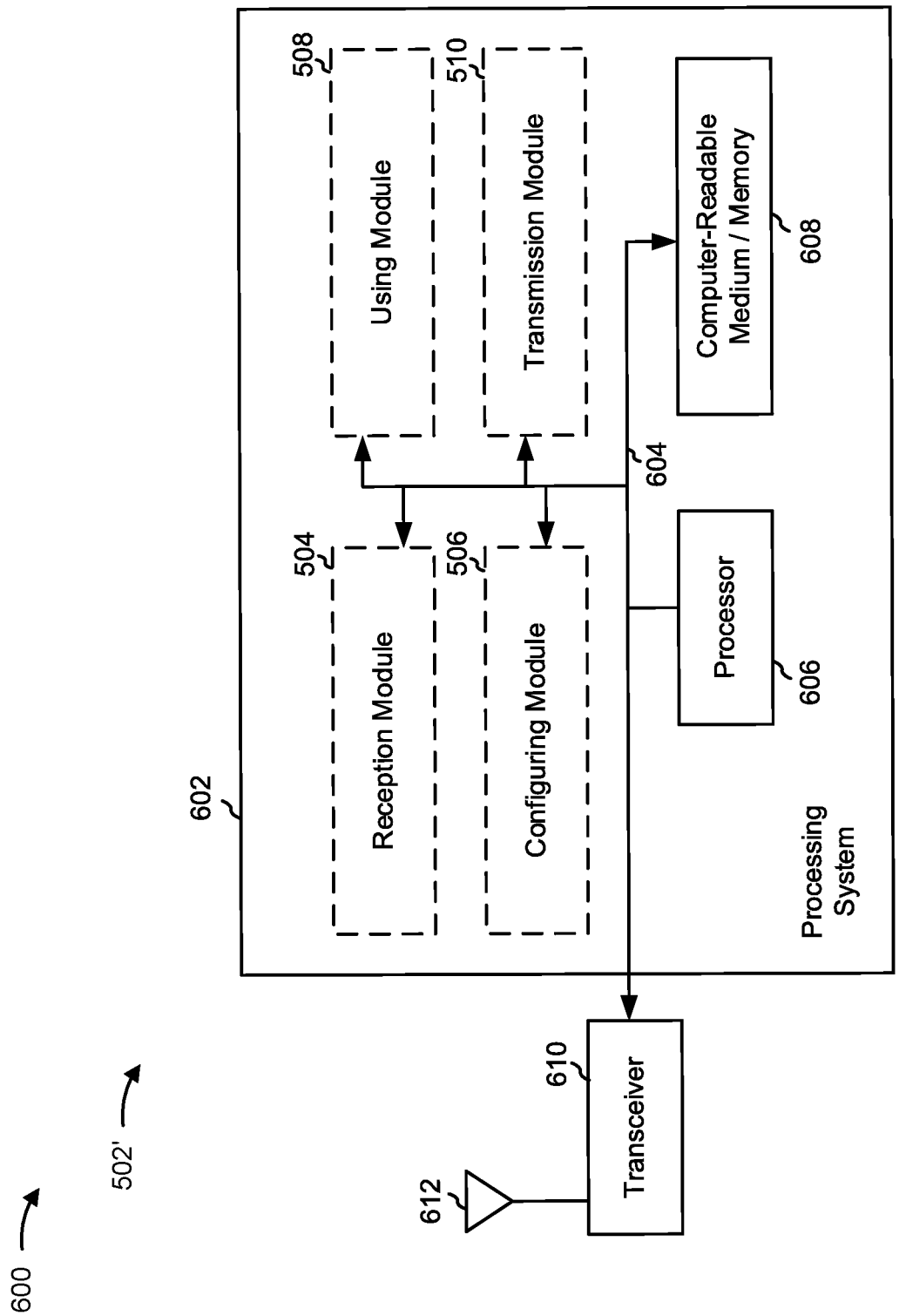
FIG. 6 is a diagram illustrating an example of a hardware implementation for an apparatus employing a processing system.

FIG. 6 is a diagram illustrating an example 600 of a hardware implementation for an apparatus (e.g., apparatus 502 described above in connection with FIG. 5) employing a processing system 602. The apparatus 502' may include, for example, a UE (e.g., UE 120).

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, and/or 510, and the computer-readable medium/memory 608. The bus 604 may also link various other circuits such as timing sources, peripherals, voltage regulators, and power management circuits, which are well known in the art, and therefore, will not be described any further.

The processing system 602 may be coupled to a transceiver 610. The transceiver 610 is coupled to one or more antennas 612. The transceiver 610 provides a means for communicating with various other apparatus over a transmission medium. The transceiver 610 receives a signal from the one or more antennas 612, extracts information from the received signal, and provides the extracted information to the processing system 602. In addition, the transceiver 610 receives information from the processing system 602 and based at least in part on the received information, generates a signal to be applied to the one or more antennas 612.

The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described supra for any particular apparatus. The computer-readable medium/memory 608 may also be used for storing data that is manipulated by the processor 606 when executing software. The processing system further includes at least one of the modules 504, 506, 508, and/or 510. The modules may be software modules running in the processor 606, resident/stored in the computer readable medium/memory 608, one or more hardware modules coupled to the processor 606, or some combination thereof.

In some aspects, the apparatus 502 for wireless communication includes means for detecting, for physical downlink shared channel transmissions in a multi-panel frequency division multiplexing deployment with multi-user, multiple input, multiple output transmission, a semi-persistent scheduling occasion update event, means for switching from performing semi-persistent scheduling for the physical downlink shared channel transmissions on a first subband to performing semi-persistent scheduling for the physical downlink shared channel transmissions on a second subband, means for determining, after a failure of a physical downlink shared channel transmission, of the physical downlink shared channel transmissions, in the first subband, a success for a retransmission of the physical downlink shared channel transmission in the second subband, means for determining to switch to the second subband after detection of the semi-persistent scheduling occasion update event based at least in part on determining the success for the retransmission of the physical downlink shared channel transmission in the second subband, means for switching from the first subband to the second subband in accordance with a semi-persistent scheduling occasion switching pattern, and/or the like. The aforementioned means may be one or more of the aforementioned modules of the apparatus 502 and/or the processing system 602 of the apparatus 502 configured to perform the functions recited by the aforementioned means.

As indicated above, FIG. 6 is provided as an example. Other examples may differ from what is described with regard to FIG. 6.

Figure 7:
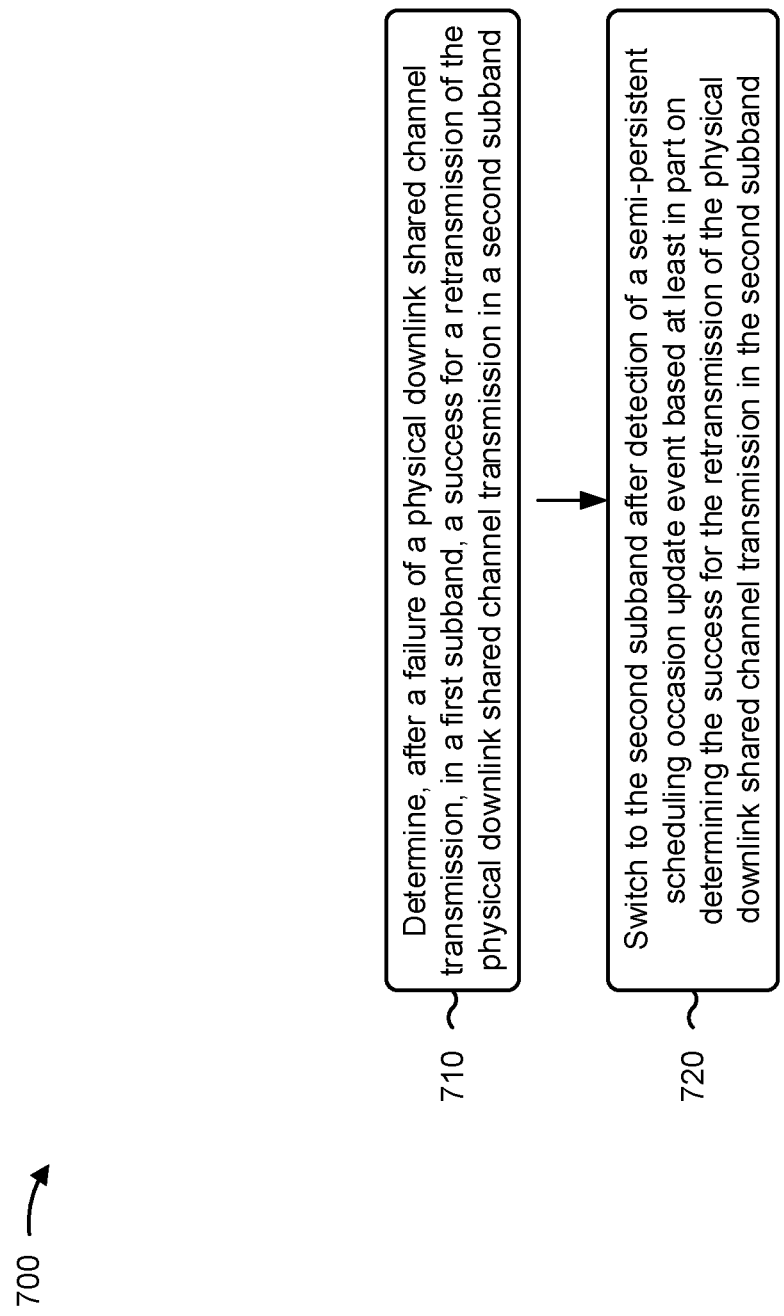
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110, the apparatus 502/502', and/or the like) performs operations associated with semi-persistent scheduling subband switching.

As shown in FIG. 7, in some aspects, process 700 may include determining, after a failure of a physical downlink shared channel transmission, in a first subband, a success for a retransmission of the physical downlink shared channel transmission in a second subband (block 710). For example, the BS (e.g., using transmit processor 220, receive processor 238, controller/processor 240, memory 242, and/or the like) may determine, after a failure of a physical downlink shared channel transmission, in a first subband, a success for a retransmission of the physical downlink shared channel transmission in a second subband, as described above with regard to FIGS. 3A and/or 3B.

As further shown in FIG. 7, in some aspects, process 700 may include switching to the second subband after detection of a semi-persistent scheduling occasion update event based at least in part on determining the success for the retransmission of the physical downlink shared channel transmission in the second subband (block 720). For example, the BS (e.g., using transmit processor 220, receive processor 238, controller/processor 240, memory 242, and/or the like) may switch to the second subband after detection of a semi-persistent scheduling occasion update event based at least in part on determining the success for the retransmission of the physical downlink shared channel transmission in the second subband, as described above with regard to FIGS. 3A and/or 3B.

Process 700 may include additional aspects, such as any single aspect or any combination of aspects described below and/or in connection with one or more other processes described elsewhere herein.

In a first aspect, the semi-persistent scheduling occasion update event is a threshold quantity of physical downlink shared channel transmission failures within a threshold amount of time.

In a second aspect, alone or in combination with the first aspect, process 700 includes detecting, for physical downlink shared channel transmissions in a multi-panel frequency division multiplexing deployment with multi-user, multiple input, multiple output transmission, a semi-persistent scheduling occasion update event; and switching from performing semi-persistent scheduling for the physical downlink shared channel transmissions on a first subband to performing semi-persistent scheduling for the physical downlink shared channel transmissions on a second subband.

In a third aspect, alone or in combination with one or more of the first and second aspects, the semi-persistent scheduling occasion update event is based at least in part on a completion of a physical downlink shared channel transmission and physical uplink control channel reception cycle.

In a fourth aspect, alone or in combination with one or more of the first through third aspects, switching from the first subband to the second subband comprises: switching from the first subband to the second subband in accordance with a semi-persistent scheduling occasion switching pattern.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
    detecting, for physical downlink shared channel transmissions in a multi-panel frequency division multiplexing deployment with multi-user, multiple input, multiple output transmission, a semi-persistent scheduling occasion update event, wherein the semi-persistent scheduling occasion update event relates to a quantity of failed transmissions or a quantity of successful retransmissions; and
    switching from performing semi-persistent scheduling for the physical downlink shared channel transmissions on a first subband to performing semi-persistent scheduling for the physical downlink shared channel transmissions on a second subband.

2. The method of claim 1, wherein the semi-persistent scheduling occasion update event relates to the quantity of failed transmissions, and wherein the quantity of failed transmissions is a threshold quantity of physical downlink shared channel transmission failures within a threshold amount of time.

3. The method of claim 1, further comprising:
    determining, after the quantity of failed transmissions, of the physical downlink shared channel transmissions, have occurred in the first subband, the quantity of successful retransmissions in the second subband; and
    determining to switch to the second subband after detection of the semi-persistent scheduling occasion update event based at least in part on determining the quantity of successful retransmissions in the second subband.

4. The method of claim 1, wherein the semi-persistent scheduling occasion update event is based at least in part on a completion of a physical downlink shared channel transmission and physical uplink control channel reception cycle.

5. The method of claim 1, wherein switching from the first subband to the second subband comprises:
    switching from the first subband to the second subband in accordance with a semi-persistent scheduling occasion switching pattern.

6. A method of wireless communication performed by a network entity, comprising:
    determining, after a failure of a physical downlink shared channel transmission in a first subband, a quantity of physical downlink shared channel retransmission successes that have occurred in a second subband; and
    switching to the second subband based at least in part on determining the quantity of physical downlink shared channel retransmission successes that have occurred in the second subband.

7. The method of claim 6, wherein the switching occurs after a semi-persistent scheduling occasion update event that includes a threshold quantity of physical downlink shared channel transmission failures within a threshold amount of time, and wherein the threshold quantity of physical downlink shared channel transmission failures include the failure of the physical downlink shared channel transmission.

8. The method of claim 6, further comprising:
    detecting, for physical downlink shared channel transmissions in a multi-panel frequency division multiplexing deployment with multi-user, multiple input, multiple output transmission, a semi-persistent scheduling occasion update event; and
    switching from performing semi-persistent scheduling for the physical downlink shared channel transmissions on the first subband to performing semi-persistent scheduling for the physical downlink shared channel transmissions on the second subband.

9. The method of claim 6, wherein the switching occurs after a semi-persistent scheduling occasion update event, and wherein the semi-persistent scheduling occasion update event is based at least in part on a completion of a physical downlink shared channel transmission and physical uplink control channel reception cycle.

10. The method of claim 6, wherein switching from the first subband to the second subband comprises:
    switching from the first subband to the second subband in accordance with a semi-persistent scheduling occasion switching pattern.

11. A network entity for wireless communication, comprising:
a memory; and
one or more processors configured to:
detect, for physical downlink shared channel transmissions in a multi-panel frequency division multiplexing deployment with multi-user, multiple input, multiple output transmission, a semi-persistent scheduling occasion update event, wherein the semi-persistent scheduling occasion update event relates to a quantity of failed transmissions or a quantity of successful retransmissions; and
switch from performing semi-persistent scheduling for the physical downlink shared channel transmissions on a first subband to performing semi-persistent scheduling for the physical downlink shared channel transmissions on a second subband.

12. The network entity of claim 11, wherein the semi-persistent scheduling occasion update event relates to the quantity of failed transmissions, and wherein the quantity of failed transmissions is a threshold quantity of physical downlink shared channel transmission failures within a threshold amount of time.

13. The network entity of claim 11, wherein the one or more processors are further configured to:
determine, after the quantity of failed transmissions, of the physical downlink shared channel transmissions, have occurred in the first subband, the quantity of successful retransmissions in the second subband; and
determine to switch to the second subband after detection of the semi-persistent scheduling occasion update event based at least in part on determining the quantity of successful retransmissions in the second subband.

14. The network entity of claim 11, wherein the semi-persistent scheduling occasion update event is based at least in part on a completion of a physical downlink shared channel transmission and physical uplink control channel reception cycle.

15. The network entity of claim 11, wherein the one or more processors, when switching from the first subband to the second subband, are to:
switch from the first subband to the second subband in accordance with a semi-persistent scheduling occasion switching pattern.

16. A network entity for wireless communication, comprising:
a memory; and
one or more processors configured to:
determine, after a failure of a physical downlink shared channel transmission in a first subband, a quantity of physical downlink shared channel retransmission successes that have occurred in a second subband; and
switch to the second subband based at least in part on determining the quantity of physical downlink shared channel retransmission successes that have occurred in the second subband.

17. The network entity of claim 16, wherein the switching occurs after a semi-persistent scheduling occasion update event that includes a threshold quantity of physical downlink shared channel transmission failures within a threshold amount of time, and wherein the threshold quantity of physical downlink shared channel transmission failures include the failure of the physical downlink shared channel transmission.

18. The network entity of claim 16, wherein the one or more processors are further configured to:
detect, for physical downlink shared channel transmissions in a multi-panel frequency division multiplexing deployment with multi-user, multiple input, multiple output transmission, a semi-persistent scheduling occasion update event; and
switch from performing semi-persistent scheduling for the physical downlink shared channel transmissions on the first subband to performing semi-persistent scheduling for the physical downlink shared channel transmissions on the second subband.

19. The network entity of claim 16, wherein the switching occurs after a semi-persistent scheduling occasion update event, and wherein the semi-persistent scheduling occasion update event is based at least in part on a completion of a physical downlink shared channel transmission and physical uplink control channel reception cycle.

20. The network entity of claim 16, wherein the one or more processors, when switching from the first subband to the second subband, are to:
switch from the first subband to the second subband in accordance with a semi-persistent scheduling occasion switching pattern.

* * * * *